July 15, 1941.   S. K. WELLMAN   2,249,282
FRICTIONAL DEVICE
Original Filed May 26, 1939

INVENTOR
BY SAMUEL K. WELLMAN
G. G. Christensen
ATTORNEY

Patented July 15, 1941

2,249,282

UNITED STATES PATENT OFFICE 2,249,282

FRICTIONAL DEVICE

Samuel K. Wellman, Cleveland Heights, Ohio, assignor to The S. K. Wellman Company, Cleveland, Ohio, a corporation of Ohio Original application May 26, 1939, Serial No. 275,837. Divided and this application January 27, 1941, Serial No. 376,098

5 Claims. (Cl. 188—259)

This invention relates to frictional devices and more particularly to means for improving the operating characteristics of clutches and brakes. More specifically it relates to a cushioned frictional facing structure adapted for use in a device wherein the frictional surfaces are brought into engagement while wholly or partially immersed in a liquid, and to the use of cushioning means in cooperation with the facing structure.

It is the primary object of the invention to provide means for reducing or eliminating chattering and grabbing in friction clutches and for overcoming non-uniform action of brakes.

In order to explain my invention and its advantages, reference is made to the accompanying drawing, in which one embodiment of the invention is shown.

Figure 1:
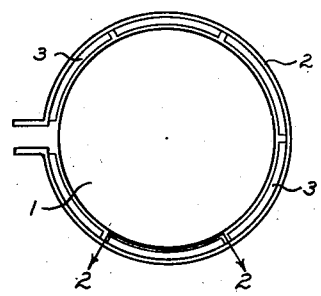
Fig. 1 is an elevational view of a brake band and drum assembly showing a brake band having a plurality of friction facing units secured to its inner surface.

Referring now to Figure 1, it will be seen that the brake assembly consists of a brake drum 1 and a brake band 2, the latter having a plurality of facing units 3, 3 secured to its inner surface. The particular feature in this structure is the cantilever type cushion mounting which is provided for at least one end portion of each of the facing units. The mounting will be better understood through reference to Figures 2 and 3, in which it will be seen that each unit is rigidly secured at one end to the brake band, while the other end is flexibly supported on a cushion element placed between the unit and the band. A composite facing element has been illustrated here, but it will, of course, be understood that homogeneous types of facing materials could be used as well. The composite units consist of a sintered powder-metal friction surface 4, bonded to a metallic backing member 5. The major portion of this friction surface may be divided into smaller areas by means of the intersecting grooves 6, 6. A portion, 7, however, situated at the cushioned end of the unit is not grooved. The purpose of this will appear subsequently.

The unit is secured at one end to the brake band 2 by means of rivets 8, 8, or by any other suitable fastening means. Near the opposite end of the unit there is provided a recess 9, having a cushion element, 10, positioned therein for the purpose of normally holding this end of the facing unit away from the brake band. Of course, when sufficient pressure is applied to the assembly to compress the cushion elements 10, 10, the facing units will be forced into contact with the band, and will be firmly supported by it. It will be understood that the facings 3, 3 are thus prevented from bearing over their entire surface against the drum 1 until sufficient pressure has been applied to them to overcome the strength of the cushioning springs.

Figure 3:
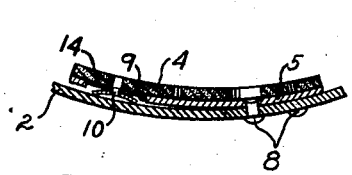
Fig. 3 is a sectional view taken along the line 3, 3 of Fig. 2.
Figure 4:
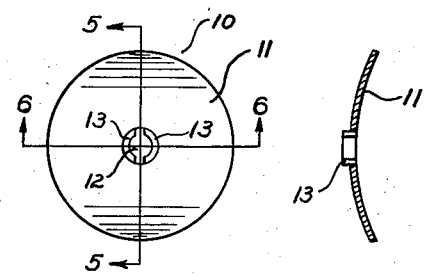
Fig. 4 is an enlarged plan view of a disc spring adapted for use in the facings of Fig. 1.
Figure 5:
Fig. 5 is a sectional view of the spring of Fig. 4 taken along the line 5, 5 thereof.
Figure 6:
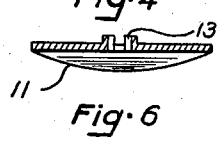
Fig. 6 is a sectional view of the spring of Fig. 4 taken along the line 6, 6 thereof.

The spring 10 of Fig. 3 is shown greatly enlarged in Figs. 4, 5 and 6. The spring consists of a disc 11 of spring sheet metal which is curved cylindrically as shown in Figs. 5 and 6 about an axis extending parallel to a diameter of the disc so as to form a portion of a cylinder. The curvature of the member is of course immaterial to its operation, and may be either single or compound. Furthermore, various other shapes of springs may be used as illustrated in United States application, Serial No. 275,837, from which this subject matter was divided. In the spring shown in Fig. 4 a central opening 12 is provided, and situated around the periphery of this opening and extending outwardly from the convex side of the spring, are projections 13, 13 the surfaces of which form wall portions of a cylinder. These projections or tangs are adapted to fit tightly into a hole 14 positioned centrally in the recess 9. It will therefore be seen that the tangs are used to center the spring in the recess and to hold it securely in place prior to and during assembly, and during use.

Figure 2:
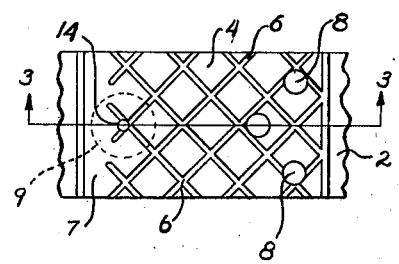
Fig. 2 is an enlarged plan view of one of the facing units as taken along the line 2, 2 of Fig. 1.

While the mounting arrangement shown in Figures 1, 2 and 3 is suitable for use wherever a cushion action is desired to improve the smoothness of operation of a frictional device, the cantilever structure which is illustrated is particularly desirable where a friction surface runs in liquid. For example, some types of brakes are constructed so as to be wholly or partially immersed in an oil bath, one usual purpose of which is to facilitate cooling of the brake members. Under such conditions the friction characteristics of the facing material are prevented from exerting their full influence at the first moment of contact or for an interval of time thereafter until the oil film separating the facing from the brake drum has been broken down or removed. The oil film between the members produces the effect that the brake seemingly fails to have any braking action for an interval of time after it is applied. It may then suddenly take effect so violently as to endanger the device. Now the cantilever cushion structure which is shown here has been found to be very helpful in overcoming this difficulty. The unscored portion 7 of the facing is provided for use in this connection. Assuming that a brake drum 1 is rotating in a counter-clockwise direction with respect to brake band 2, it will be seen that the cushioned and unscored end of each of the friction units will first contact the rotating drum, with the result that portion 7 will be caused to bear under low pressure upon the drum and act as a scraper which will remove the excess oil and tend to reduce the thickness of the oil film remaining upon the surface of drum 1. Now as the brake pressure is increased, the cushion 10 will be compressed into its recess with the result that more frictional material will be brought into contact with the drum. This increased area will then tend to reduce the thickness of the oil film even further so that as this action continues the oil film will be removed gradually. By the time the whole frictional unit has been brought into contact with the drum the oil film will have been substantially dissipated and the friction characteristics of the facing material will be unimpeded in exerting their full braking action. In this way sudden and violent engagement is prevented, and the brake action is rendered more uniform. It will, of course, be understood that this type of action is not limited to brake members but may be applied to clutches as well, or to any device wherein this type of difficulty occurs when it is operated in a liquid.

While the invention has been described in connection with preferred embodiments wherein the advantages are most readily apparent, it should be understood that the principles may be applied to many uses not mentioned specifically herein. Furthermore, the illustrations represent mere exemplary structures, many modifications of which will occur to those skilled in the art. It accordingly is desired that the invention be restricted in scope only by the following claims.

This is a division of my application Serial Number 275,837, filed May 26, 1939.

Having now fully explained my invention, what I claim is:

1. In a frictional device having engageable friction surfaces which operate in a liquid, the combination of: a support having a first generally-elongated, relatively thin friction member disposed flatwise thereon and secured within a portion thereof to said support, one end of said member being yieldingly mounted for movement toward and away from said support while being normally held away therefrom; a second friction member having a face thereof disposed for relative motion with respect to said first friction member when brought into face to face contact therewith, the face of said second friction member having desired frictional characteristics relative to the exposed face of said first member, and the relative motion between said faces being such that said second friction member is first engaged by said yieldingly mounted end of said first member, said first friction member being so arranged that said yieldingly mounted end is the leading end and is effective in removing excess liquid from the surface of said second member.

2. In a friction device having friction surfaces which operate in a liquid, the combination of: a support having a first generally-elongated, relatively thin friction member disposed flatwise thereon and secured at one of its ends to said support, its opposite end being yieldingly mounted for movement toward and away from said support while being normally held away therefrom; a second friction member having a face thereof disposed for relative motion with respect to said first member when brought into face to face contact therewith, the face of said second friction member having desired frictional characteristics relative to the exposed face of said first member, and the relative motion between said faces being such that said second friction member is first engaged by said yieldingly mounted end of said first member, said first friction member being so arranged that said yieldingly mounted end is effective in removing excess liquid from the surface of said second member.

3. The combination as claimed in claim 2 wherein the engageable surface of said first friction member is traversed with grooves which extend partway through its thickness and are disposed within an area of said face extending from the secured end of said member to an intermediate position and wherein the area of said face which extends from said intermediate position to the unsecured end of the member is free of grooves.

4. In a frictional braking device adapted to operate in a liquid, the combination of: a brake drum adapted for rotation about its axis; a band-like support having a plurality of elongated plate-like friction segments of reinforced sintered metal disposed flatwise thereon in concentric relation to the peripheral surface of said drum for wiping engagement with said peripheral surface, each of said segments having an end edge which is adapted to remove excess liquid from said surface when the direction of rotation of said drum makes it the leading edge of the segment, said leading edge of each segment being yieldingly mounted relative to said support so as to first engage the drum when the brake is applied.

5. In a frictional device adapted to operate in a liquid, the combination of: a rotary frictional member; a support disposed adjacent said rotary member and having a plate-like frictional element of reinforced sintered metal disposed thereon in flatwise relation to a surface of said rotary member for wiping engagement with said surface, said element having an edge which is adapted to remove excess liquid from said surface when the direction of rotation of the member makes said edge the leading edge of the element; and means for bringing said leading edge into wiping engagement with said surface in advance of other portions of the element.

SAMUEL K. WELLMAN.